(12) United States Patent
Sakurai et al.

(10) Patent No.: US 7,008,901 B2
(45) Date of Patent: Mar. 7, 2006

(54) EMULSION FOR THERMAL RECORDING MATERIAL AND THERMAL RECORDING MATERIALS MADE BY USING THE SAME

(75) Inventors: Shinjirou Sakurai, Sodegaura (JP); Masaya Kusumoto, Sodegaura (JP); Masatoshi Kaneko, Sodegaura (JP); Futoshi Hoshino, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 299 days.

(21) Appl. No.: 10/611,955

(22) Filed: Jul. 3, 2003

(65) Prior Publication Data

US 2004/0058815 A1    Mar. 25, 2004

Related U.S. Application Data

(63) Continuation-in-part of application No. 09/937,005, filed as application No. PCT/JP01/00276 on Jan. 18, 2001, now abandoned.

(30) Foreign Application Priority Data

Jan. 19, 2000    (JP)    ............................. 2000-010710

(51) Int. Cl.
*B41M 5/40*    (2006.01)
(52) U.S. Cl. ...................... 503/200; 428/327; 428/407; 503/226
(58) Field of Classification Search ............. 428/195.1, 428/327, 407; 503/327, 200, 226
See application file for complete search history.

(56) References Cited

U.S. PATENT DOCUMENTS 5,409,881 A    4/1995  Mori et al.
5,919,729 A    7/1999  Mori et al.

FOREIGN PATENT DOCUMENTS

| EP | 0 436 390 | 7/1991 |
|---|---|---|
| EP | 0 522 791 A1 | 1/1993 |
| EP | 0 624 606 A1 | 11/1994 |
| EP | 0 654 454 A1 | 5/1995 |
| GB | 1 555 868 | 11/1979 |
| JP | 43-4160 | 2/1968 |
| JP | 45-14039 | 5/1970 |
| JP | 55-95593 | 7/1980 |
| JP | 56-13993 | 2/1981 |
| JP | 56-126183 | 10/1981 |
| JP | 57-19036 | 4/1982 |
| JP | 57-188394 | 11/1982 |
| JP | 58-38733 | 3/1983 |
| JP | 61-284483 | 12/1986 |
| JP | 03-067689 | 3/1991 |
| JP | 04-12884 | 1/1992 |
| JP | 04-189587 | 7/1992 |
| JP | 05-254249 | 10/1993 |
| JP | 06-135135 | 5/1994 |
| JP | 06-183151 | 7/1994 |
| JP | 8-118560 | 5/1996 |

*Primary Examiner*—Bruce H. Hess
(74) *Attorney, Agent, or Firm*—Buchanan Ingersoll PC

(57) ABSTRACT

The present invention provides an emulsion for thermal recording material to be used as the resin component of a protective layer constituting a thermal recording material, characterized by comprising a copolymer resin (A) prepared by copolymerizing (a) methacrylamide with (b) a vinyl monomer having a carboxyl group and resin particles (B) prepared by polymerizing (c) a vinyl monomer, with the resin (A) distributed substantially on the surfaces of the resin particles (B).

18 Claims, 1 Drawing Sheet

EMULSION FOR THERMAL RECORDING MATERIAL AND THERMAL RECORDING MATERIALS MADE BY USING THE SAME

TECHNICAL FIELD

The present invention relates to thermal recording materials and an emulsion used in production of such thermal recording materials. More particularly, the present invention relates to thermal recording materials which cause no fogging of an underlying layer, which are superior in storage stability of recording layer and which have high gloss and excellent printability as well as to an emulsion used in production of such thermal recording materials.

BACKGROUND ART

Recording materials obtained by forming, on a substrate, an ordinarily colorless or light-colored recording layer composed mainly of an electron-donating basic dye and an organic or inorganic electron-accepting substance and further containing a binder, a filler, a sensitizer, a lubricant, etc. are well known as a thermal recording material utilizing a color reaction caused by the thermal melting and contact of functional carriers (JP-B-43-4160, JP-B-45-14039, etc.).

In these thermal recording materials, a recording function is beforehand imparted to the substrate (e.g. a paper, a synthetic paper or a synthetic film). Therefore, an image is obtained only by heating with a thermal head, a thermal pen, a laser beam or the like and no complicated development step is required; the structure of the recording apparatus used is relatively simple and compact; and the maintenance is easy. Accordingly, the thermal recording materials are in wide use as output sheets for various printers such as facsimile, printer for industrial instrumentation and for medical use, handy terminal, POS system, note issuing system and the like.

However, since the thermal recording materials are used in various application fields, they have had the following problems in daily handling. That is, they have had problems, for example, (1) detachment of recording layer when they come in contact with water, (2) when a vinyl chloride film or sheet is laminated thereon, disappearance or fading of image caused by the plasticizer contained in the film or sheet, and (3) color disappearance or fading, color development, etc. in contact with oil or fat or solvent.

In order to solve these problems, investigations for improvement have been made on the binder or color-developing materials contained in the thermal recording layer (JP-A-55-95593, JP-B-57-19036 and JP-A-58-38733). However, no thermal recording material satisfactory in all of water resistance, plasticizer resistance, oil resistance, solvent resistance, etc. has been developed yet. Particularly in a situation of recent years where the applications of thermal recording materials are widening and higher durability is required for them, the above-mentioned problems are difficult to alleviate only by the improvements of the binder or color-developing materials contained in the thermal recording layer.

Hence, as a countermeasure for the above problems, formation of a protective layer on, a thermal recording layer was proposed (e.g. JP-A-56-126183, JP-A-56-13993, JP-A-57-188394 and JP-A-61-284483).

This formation of a protective layer on a thermal recording layer enabled the slightly higher durability of recording layer or recorded image. In recent years, it has come to be required that the protective layer possesses, in addition to a protective function, a new function for thermal recording material. In particular, labels and image-output sheets for use in medical measurement or videoprinter are required to give a recorded surface having high gloss or mirror-surface gloss. In the labels, high-quality feeling for decorativeness is aimed at and, in the image-output sheets, the property possessed by silver salt film is aimed at.

For the above requirement, there were made a proposal of forming, on a thermal recording layer, a glossy protective layer (an ultraviolet-curing coating layer or an electron beam-curing coating layer).(JP-A-3-67689, JP-A-4-189587, etc.): a proposal of forming, on a thermal recording layer, an intermediate layer and forming thereon, as in the above proposal, an ultraviolet-curing coating layer or an electron beam-curing coating layer (JP-A-6-183151 and JP-A-6.-135135); and a proposal of forming, by coating, the above-mentioned curing coating layer on a flat substrate (a cast drum or the like), drying the layer and transferring, by pressure bonding, the dried layer onto a thermal recording layer (JP-A-4-12884). All of these proposals use a reactive diluent or a polyfunctional oligomer and, therefore, have various problems and are not sufficient. That is, the reactive diluent and the polyfunctional oligomer need careful handling for their dangerousness; they cause shrinkage during curing, making it difficult to obtain a feeling of mirror surface finish; in the former proposal of forming a glossy protective layer directly on a thermal recording layer, the reactive diluent and the polyfunctional oligomer act on the thermal recording layer, causing fogging of an underlying layer; in the latter proposal of forming an intermediate layer for prevention of fogging of an underlying layer, the sensitivity during printing is low. For the above requirement, there were also made various proposals of conducting cast coating using a water borne/dispersible resin (JP-A-5-254249, etc.). However, since the resin used is insufficient in heat resistance, all these proposals have problems, for example, in that a relatively large amount of a filler need be used, which makes it difficult to obtain sufficient gloss and inevitably reduces the barrier function of protective layer.

In view of the above situation, the present invention aims at providing a thermal recording material which has durability (water resistance and resistance to oil and fat) higher than conventional thermal recording materials have, which is superior in color developing sensitivity and traveling stability, and which has an excellent protective layer capable of imparting high surface gloss; and an emulsion used in production of such a thermal recording material.

DISCLOSURE OF THE INVENTION

Water borne/dispersible resins have forms of a water-soluble resin and an emulsion. The emulsion, as compared with the water-soluble resin, has advantages such as (1) has good water resistance, (2) has a low viscosity even in a high resin concentration and, therefore, is easy to handle, (3) can exhibit the intended function efficiently by controlling the structure of emulsion particles, (4) is not dangerous and has no legal restriction regarding handling, and (5) is low in toxicity. In order to solve the above-mentioned problems, the present inventors made a study while utilizing the above advantages of emulsion to the maximum extent. As a result, the present inventors found out that the above aim of the present invention could be achieved by using an emulsion of water borne/dispersible resin, having a particular composition and a particular structure. The present invention has been completed based on this finding.

The present invention, which solves the above-mentioned problems, includes, for example, the subject matters described in the following [1] to [12]:

[1] An emulsion for thermal recording material to be used as a material of a resin component for a protective layer of the thermal recording material, said emulsion comprising resin particles (B) having a glass transition temperature less than 60° C. and more than 0° C., or of 60° C., and a copolymer resin (A) prepared by copolymerizing (a) methacrylamide and (b) a vinyl monomer having a carboxyl group; and said resin particles (B) being prepared by polymerizing (c) a vinyl monomer with said copolymer resin (A) so that the copolymer (A) is distributed substantially on the surfaces of the resin particles (B).

[2] The emulsion for thermal recording material according to [1], which comprises resin particles (B) prepared by polymerizing (c) a vinyl monomer in the presence of a copolymer resin (A) obtained by making water-soluble, with a base, a copolymer resin (A) prepared by copolymerizing a monomer mixture containing (a) methacrylamide and (b) a vinyl monomer having a carboxyl group.

[3] The emulsion for thermal recording material according to [1], wherein the glass transition temperature of the resin particles (B) is 4° C. to 38° C.

[4] An emulsion for thermal recoding material to be used as a-material of a resin component for a protective layer of the thermal recording material, said emulsion comprising resin particles (B) having a glass transition temperature less than 60° C. and more than 0° C., or of 60° C., and prepared by polymerizing (c) a vinyl monomer in the presence of a copolymer resin (A) obtained by making water-soluble with a base, a copolymer resin (A) prepared by copolymerizing a monomer mixture containing (a) methacrylamide and (b) a vinyl monomer having a carboxyl group.

[5] The emulsion for thermal recording material according to [4], wherein 30 to 95 parts by weight of the methacrylamide (a) and 2 to 50 parts by weight of the carboxyl group-containing vinyl monomer (b) are contained in 100 parts by weight of the solid content of the monomer mixture.

[6] The emulsion for thermal recording material according to [4], wherein the vinyl monomer (c) contains a nitrile group-containing vinyl monomer or an aromatic vinyl monomer.

[7] The emulsion for thermal recording material according to [4], wherein the amount of the copolymer resin (A) is 20 to 200 parts by weight when the total amount of the vinyl monomer (c) is 100 parts by weight.

[8] The emulsion for thermal recording material according to [4], wherein the glass transition temperature of the resin particles (B) is 4° C. to 38° C.

[9] A process for producing an emulsion for thermal recording material to be used as a material of a resin component for a protective layer of the thermal recording material comprising:

a step of copolymerizing a monomer mixture containing (a) methacrylamide and (b) a vinyl monomer having a carboxyl group, to obtain a copolymer resin, and a step of treating the copolymer resin with a base to convert it into a water-soluble copolymer resin (A) and then polymerizing (c) a vinyl monomer in the presence of the copolymer resin (A), to obtain resin particles (B), said particles (B) having a glass transition temperature less than 60° C. and more than 0° C. or of 60° C.

[10] The process for producing an emulsion for thermal recording material according to [9], wherein 30 to 95 parts by weight of the methacylamide (a) and 2 to 50 parts by weight of the carboxyl group-containing vinyl monomer (b) are contained in 100 parts by weight of the solid content of the monomer mixture.

[11] The process for producing an emulsion for thermal recording material according to [9], wherein the vinyl monomer (c) contains a nitrile group-containing vinyl monomer or an aromatic vinyl monomer.

[12] The process for producing an emulsion for the thermal recording material according to [9], wherein the amount of the copolymer resin (A) is 20 to 200 parts by weight when the total amount of the vinyl monomer (c) is 100 parts by weight.

[13] The process for producing an emulsion for the thermal recording material according to [9]. wherein the glass transition temperature of the resin particles (B) is 4° C. to 38° C.

[14] A thermal recoding material comprising a substrate, a thermal recoding layer formed thereon, and protective layer formed on the thermal recoding layer and/or on the back side of the substrate, wherein the resin component of the protective layer is obtained from the emulsion of [1].

[15] A thermal recording material comprising a substrate, a thermal recoding layer formed thereon, and a protective layer formed on the thermal recording layer and/or on the back side of the substrate, wherein the resin component of the protective layer is obtained from the emulsion of [4].

The resin particles (C) of the emulsion of the present invention preferably have a structure in which the copolymer resin (A) is distributed substantially on the surfaces of the resin particles (B). As the structure in which the copolymer resin (A) is distributed substantially on the surfaces of the resin particles (B), there can be mentioned a structure in which the copolymer (A) is present on part of the surfaces of the resin particles (B) and a two-layered structure in which the whole surfaces of the resin particles (B) are covered with the copolymer resin (A). The distribution of the copolymer resin (A) on the resin particles (B) may be any as long as the aim of the present invention can be achieved sufficiently. Incidentally, the particle structure of the emulsion of the present invention can be easily known by a contrast obtained in observation using a transmission type electron microscope. The particle structure of the emulsion of the present invention can also be easily determined from the water-swollen particle diameters measured in a water-diluted state by a dynamic light-scattering method and the dry particle diameters measured using a scanning type electron microscope, because the difference between the above two diameters can be considered to indicate the thickness of the copolymer resin (A) distributed on the surfaces of the resin particles (B). In this case, the water-swollen particle diameters are observed ordinarily at about 2 to 5 times the dry particle diameters, but cannot be specified at a particular level because the copolymer resin (A) distributed on the resin particles (B) is influenced by the particle diameters of the resin particles (B), the change in saturated adsorption amount of (A) dependent upon the diameters of (B) and the weight proportion of the inner layer [the copolymer resin (B)] and the outer layer [the copolymer resin (A)]. This is apparent from the fact that the particle diameters measured, by the above dynamic light-scattering method, for an emulsion obtained by separately producing a copolymer resin (A) and resin particles (B') [a polymer of a vinyl monomer (c)] and mixing them are the same as the particle diameters measured for the resin particles (B') alone by the same method and, thus, there arises no difference in particle diameters when the copolymer resin (A) is not distributed on the resin particles (B').

In the present invention, the copolymer resin (A) satisfies the basic properties required for the protective layer of thermal recording material, that is, storage stability and traveling stability (heat resistance) and, moreover, has a function of imparting high gloss. In the present invention, at least part of the carboxyl group contained in the copolymer resin (A) is neutralized with a base, whereby the copolymer resin (A) is made a water-soluble resin; then, in the presence thereof, a vinyl monomer, which can provide a relatively low glass transition temperature when a resin is formed by the vinyl monomer, or a vinyl monomer mixture (consisting of two or more monomers) adjusted so as to provide a resin having a relatively low glass transition temperature is polymerized to obtain resin particles (B). At this time, the water-soluble copolymer (A) acts as a protective colloid (or a polysoap) and can allow the resinparticles (B) to be present in water stably in a fine state. Naturally in the thus-produced resin emulsion, the resin particles (B) are present as an inner layer and the copolymer resin (A) is distributed as an outer layer (a surface layer) in an adsorbed or grafted state. Therefore, when this emulsion is used as the resin component of the protective layer of a thermal recording material, the storage stability of the thermal recording layer is kept at a satisfactory level; excellent traveling stability (heat resistance) and high gloss can be obtained; the inner layer acts as a stress-relaxing layer and supplements the hard and fragile properties of the protective layer of the present invention in which the outer layer [the copolymer resin (A)] forms a continuous layer; and the protective layer has good durability. By, in producing the emulsion of the present invention, varying the proportion of the inner layer and the outer layer, the concentrations or hardnesses of the resins can appropriately be set as necessary.

BEST MODE FOR CARRYING OUT THE INVENTION

In the present invention, the methacrylamide (a) constituting the copolymer resin (A) shows excellent effects in traveling stability (heat resistance), plasticizer resistance, oil resistance and solvent resistance. The amount of the methacrylamide (a) used is preferably 30% by weight or more, more preferably 50% by weight or more when the solid content of the monomers mixture constituting the copolymer resin (A) is taken as 100 parts by weight. The upper limit thereof is preferably 95% by weight or less, more preferably 80% by weight or less. When the amount of the methacrylamide (a) used is too small, necessary heat resistance may not be obtained, traveling stability may be impaired, and sufficient plasticizer resistance may not be obtained. When the amount of the methacrylamide. (a) used is too large, a significant increase in viscosity may occur during the production of resin particles (B) and, in some cases, the stabilization (protective colloid) function of the water-soluble resin (A) may decrease owing to, for example, agglomeration.

In the present invention, the carboxyl group-containing vinyl monomer (b) has a function of making the copolymer resin (A) water-soluble so as to act as a stabilizer. By introducing the carboxyl group-containing vinyl monomer (b) into the skeleton of the copolymer resin (A), the copolymer resin (A) can be neutralized with a base (e.g. ammonia) and can be converted into a water-soluble resin which is a stabilizer (a protective colloid). Further the carboxyl group of the vinyl monomer (b) gives bondability and dispersibility to a filler as necessary added to a protective layer and also acts effectively as a functional group to a crosslinking agent added as necessary.

The amount of the carboxyl group-containing vinyl monomer (b) used is preferably 2% by weight or more, more preferably 5% by weight or more when the solid content of the monomers mixture constituting the copolymer resin (A) is taken as 100 parts by weight The upper limit thereof is preferably 50% by weight or less, more preferably 40% by weight or less, most preferably 30% by weight or less. When the amount of the monomer (b) used is too small, sufficient water-solubility may not be obtained even after addition of a base, and the resulting water-soluble copolymer resin may not give sufficient stability. When the amount of the monomer (b) is too large, unnecessary color development (fogging) of thermal recording layer may arise.

Examples of the carboxyl group-containing vinyl monomer include ethylenically unsaturated monobasic carboxylic acids such as acrylic acid, methacrylic acid, crotonic acid and the like; ethylenically unsaturated dibasic carboxylic acids such as itaconic acid, maleic acid, fumaric acid and the like; and monoalkyl esters. These monomers can be used singly or in combination of two or more kinds.

In the present invention, there can also be used as necessary, in addition to the methacrylamide (a) and the carboxyl group-containing vinyl monomer (b), a vinyl monomer (c) copolymerizable with both or either of the monomers (a) and (b). By using the vinyl monomer (c) together, it is possible to allow the copolymer resin (A) as a stabilizer (a protective colloid) to have a higher function as a polymerization stabilizer or to contain a reactive group with a crosslinking agent used as necessary at the time of formation of protective layer. When there is used, for example, a hydrophobic vinyl monomer such as styrene, (meth)acrylic acid ester or the like, the resulting copolymer resin (A) can contain a hydrophobic moiety and thereby can have a higher stabilizer (protective colloid) ability. When there is used a hydroxyl group-containing vinyl monomer, the resulting copolymer resin (A) reacts effectively with a crosslinking agent having an aldehyde or methylol group.

There is no particular restriction as to the amount of the monomer (c) used. However, the amount is preferably 20% by weight or less, more preferably 10% by weight or less when the solid content of the monomers mixture constituting the copolymer resin (A) is taken as 100 parts by weight. When the amount is too large, reduction in heat resistance and plasticizer resistance may arise.

As examples of the vinyl monomer (c), there can be mentioned (meth)acrylic acid esters such as methyl (meth)acrylate, ethyl (meth)acrylate, butyl (meth)acrylate, 2-ethylhexyl (meth)acrylate, lauryl (meth)acrylate, 2-hydroxyethyl (meth)acrylate, 2-hydroxypropyl (meth)acrylate, 2-hydroxybutyl (meth)acrylate, 2-aminoethyl (meth)acrylate, 2-(N-methylamino)ethyl (meth)acrylate, 2-(N,N-dimethylamino)ethyl (meth)acrylate, glycidyl (meth)acrylate and the like; vinyl esters such as vinyl acetate, vinyl propionate and the like; aromatic vinyl monomers such as styrene, α-methylstyrene, divinylbenzene and the like; N-substituted unsaturated carboxylic acid amides such as acrylamide, N-methylol(meth)acrylamide and the like; nitrile group-containing-monomers such as (meth)acrylonitrile and the like; heterocyclic vinyl compounds such as vinylpyrrolidone and the like; vinylidene halides such as vinylidene chloride, vinylidene fluoride and the like; α-olefins such as ethylene, propylene and the like; dienes such as butadiene and the like. These monomers can be used singly or in combination of two or more kinds. Of these, there are preferred unsaturated monomers having a functional group (e.g. hydroxyl group, methylol group, glycidyl group or amino group) and/or relatively hydrophobic monomers (e.g. styrene and (meth)acrylic acid ester), etc., for the above-mentioned reasons.

There is no particular restriction as to the kind of the vinyl monomer used when the resin particles (B) are produced using the above-mentioned water-soluble resin as a stabilizer (a protective colloid) The vinyl monomer is selected from the monomers group mentioned above as examples of the monomer (c), and is used singly or in combination of two or more kinds. As the vinyl monomer, a vinyl monomer which can provide the resin of the resin particles (B) having a glass transition temperature (Tg) of 60° C. or less than 60° C. and more than 0° C. may be preferably used. A combination of two or more different vinyl monomers, which are combined so as to provide the resin of the resin particles (B) having a glass transition temperature between 0 to 60° C. but 0° C. is excluded may be also preferably used. As the glass transition temperature of the resin for the resin particles (B), the range from 2 to 60° C. is preferable, the range from 4 to 60° C. is further preferable and the range from 4 to 38° C. is more preferable. When the glass transition temperature is 0° C. or less, the protective layer formed may be insufficient in heat resistance. When the glass transition temperature is more than 60° C., the protective layer formed lacks in flexibility and, in some cases, causes cracking which may impair the storage stability of thermal recording layer.

When there is used, as the vinyl monomer, a nitrile group-containing vinyl monomer, particularly (meth)acrylonitrile, the resulting protective layer can have effectively improved heat resistance and storage stability. When there is used an aromatic vinyl monomer, particularly styrene the resulting protective layer can have improved gloss.

In the present invention, the solid content proportions of the vinyl monomer for forming the resin particles (B) and the copolymer resin (A) are such that the copolymer resin (A) is preferably 20% by weight or more, more preferably 30% by weight or more when the total amount of the vinyl monomer is taken as 100 parts by weight. The upper limit of the copolymer resin (A) is preferably 200% by weight or less, more preferably 150% by weight or less. When the amount of the copolymer resin (A) is too small, there may arise problems in polymerization stability [for example, an agglomerate appear in a large amount in production of resin particles (B)], and sufficient heat resistance (which is one of the most basic properties in the present invention) may not be obtained. Meanwhile, when the amount of the copolymer resin (A) is too large, the resin component in emulsion tends to be very hard and brittle and no sufficient flexibility required for protective layer may not be obtained even if the glass transition temperature of the resin particles (B) is controlled by selecting the vinyl monomer(s).

There is no particular restriction as to the molecular weight of the copolymer resin (A). However, the copolymer resin (A) preferably has a viscosity of 100 to 2,000 mPa·s when neutralized with aqueous ammonia for conversion into a water-soluble resin having a solid content of 25%. A lower viscosity has a higher ability as a stabilizer (a protective colloid) and enables production of resin particles (B) more stably and in a lower viscosity, but gives lower heat resistance and water resistance. Meanwhile, when the viscosity is more than 2,000 mPa·s, a very high viscosity is incurred in production of resin particles (B), which may impair the production. The control of molecular weight is generally made by use of molecular weight-controlling agent (a chain transfer agent) selection of polymerization temperature and control of Initiator amount. In the copolymer resin (A) of the present invention, since generally no oil-soluble molecular weight-controlling agent acts effectively, the molecular weight control is preferably made by selection of polymerization temperature and control of initiator amount, and polymerization conditions need be appropriately set to achieve the above-mentioned viscosity range. However, the molecular weight control is not restricted thereto.

There is no particular restriction as to the number-average particle diameter of the resin particles (C) of the present invention. However, the number-average particle diameter is preferably 50 to 500 nm, more preferably 70 to 300 nm. Too small a number-average particle diameter may result in an emulsion of very high viscosity. In this case, the resin concentration in production of the resin particles (B) must be low and accordingly the drying of emulsion coated for formation of protective layer is slow, which reduces the productivity of the thermal recording material of the present invention and is not preferred economically. Meanwhile, with too large a number-average particle diameter, significant reduction in gloss takes place and formation of dense protective layer is difficult, which may result in insufficient storage stability of thermal recording layer. The number-average particle diameter can be controlled by the molecular weight and composition of the copolymer resin (A) and the use of a surfactant, and is adjusted so as to fall in the above range.

In the present invention, the resin particles (C) can be produced by a known polymerization technique except that the copolymer resin (A) is used as a stabilizer. That is, it is possible that the copolymer (A) as a stabilizer (a protective colloid) is produced beforehand and then the resin particles (B) are produced, or, that the copolymer resin (A) is produced and is successively the resin particles (B) are produced. There is no particular restriction as to the production of the resin particles (B).

In production of the resin particles (B), an emulsifier may be used as necessary, for imparting stability. There can be used, singly or in combination of two or more kinds, for example, anionic surfactants such as sulfuric acid ester of higher alcohol, alkylbenzenesulfonic acid salt, aliphatic sulfonic acid salt, alkyl diphenyl ether sulfonic acid salt and the like; and non-ionic surfactants such as alkyl ester, alkyl phenyl ether, alkyl ether, etc. of polyethylene glycol. There is no particular restriction as to the amount of such an emulsifier used, but a necessary and minimum amount is preferred in view of the water resistance of the resin.

In production of the copolymer resin (A) and the resin particles (B) there is used, as a polymerization initiator, a water-soluble initiator such as persulfate, hydrogen peroxide, organic hydroperoxide, azobiscyanovalerid acid or the like, an oil-soluble initiator such as benzoyl peroxide, azobisisobutyronitrile or the like, or a redox initiator which is a combination with a reducing agent. There is no particular restriction as-to the amount of the polymerization initiator used, but the polymerization initiator is used in an amount of ordinarily 0.1 to 10.0 parts by weight, preferably 0.1 to 5 parts by weight relative to 100 parts by weight of the vinyl monomer.

In the present invention, a base is used as a neutralizing agent when the copolymer resin (A) is made water-soluble. A neutralizing agent is used as well at the time of pH adjustment of emulsion after formation of resin particles (B). Aqueous ammonia is used as these neutralizing agents. As other examples of the neutralizing agent, there can be mentioned sodium hydroxide, potassium hydroxide and various amines; however, these neutralizing agents may invite reduced water resistance, damage of thermal head, or desensitization in thermal color development. Aqueous ammonia causes no such adverse effects and, moreover, has an advantage that, since it is easily removed at relatively low temperatures, water resistance appears in a short time after formation of protective layer.

In the present invention, it is possible to use a filler in the protective layer as necessary. There is no particular restriction as to the amount of the filler used, but the amount and kind of the filler can be freely selected as long as the aim of the present invention is not impaired. As the filler, there can be mentioned inorganic fillers such as calcium carbonate, magnesium carbonate, kaolin, talc, clay, aluminum hydroxide, barium sulfate, silicon oxide, titanium oxide, zinc oxide, colloidal silica and the like; organic fine particles such as fine powder of urea-formaldehyde resin, fine powder of polystyrene and the like; and so forth. These fillers are used singly or in combination of two or more kinds.

As components other than filler, used as necessary, there can be mentioned an agent for imparting water resistance (a crosslinking agent); lubricants for improving traveling property (heat resistance and sticking resistance), such as metal salt of higher fatty acid, higher fatty acid amide, low-molecular weight polyolefin fine particles and the like; an ultraviolet absorber; an antioxidant; an antifoaming agent; a wetting agent; a viscosity-controlling agent; and other auxiliary agents and additives.

Of these, an agent for imparting water resistance (a crosslinking agent) is used preferably because it makes the protective layer stronger, makes the thermal recording layer and the recorded image more durable, and can enhance the thermal head properties (sticking resistance and traveling stability). As examples of the crosslinking agent, there can be mentioned glyoxal, dimethylolurea, glycidyl ether of polyhydric alcohol, ketene dimer, dialdehyde starch, epichlorohydrin-modified polyamideamine, zirconium carbonate ammonium, aluminum sulfate, calcium chloride and boric acid.

In the present invention, as a material constituting the protective layer, other known water borne/dispersible resin may be used as necessary, in addition to the copolymer resin (A) and the resin particles (B). As examples of such a resin, there can be mentioned natural resins (e.g. sodium alginate, starch, casein and cellulose), and synthetic resins. Of these, a modified polyvinyl alcohol is preferred and, as examples thereof, there can be mentioned carboxyl-modified, acetoacetyl-modified, epoxy-modified, silanol-modified, amino-modified, olefin-modified, amide-modified and nitrile-modified polyvinyl alcohols. However, the resin is not restricted thereto.

The emulsion for thermal recording material according to the present invention can be appropriately applied on a thermal recording layer, the backside of a substrate and any site where a high function of protective layer can be obtained.

In the present invention, there is no particular restriction, either, as to the color development system of the thermal recording layer. Incidentally, this color development system includes, for example, those using a leuco dye and an acidic substance (typified by a phenolic substance), or using an imino compound and an isocyanate compound, or using a diazo compound and a coupler.

In the present invention, the protective layer is formed, by coating, on a known thermal recording layer ordinarily formed on a substrate (e.g. a paper, a synthetic paper or a film), and/or on the backside of the substrate or between the substrate and the thermal recording layer, in an amount (dried amount) of 1 to 10 g/m$^2$, using an air knife coater, a gravure coater, a roll coater or the like, whereby the aim of the present invention is achieved. When the protective layer is required to have high gloss and mirror-surface gloss, the surface of the protective layer formed is subjected to a cast treatment; or a protective layer is formed, by coating, on a mirror-surface metal drum, a flat PET film or the like and then dried and the protective layer is transferred, by press-bonding, onto a thermal recording layer formed beforehand.

The present invention is specifically described below by way of Examples. However, the present invention is in no way restricted by these Examples. Incidentally, parts and % in the Examples are parts by weight and % by weight, respectively, in all cases, unless otherwise specified.

Production of Resin Particles (C)

Production Example C1

100.0 parts of water was fed into a separable flask equipped with a stirrer and a reflux condenser. The atmosphere inside the flask was replaced by nitrogen gas and the flask contents were heated to 75° C. Then. 2.0 parts of ammonium persulfate was added. Thereto was added, continuously in 2 hours with stirring, a mixture of vinyl monomers and water having the following composition. The resulting mixture was kept for 2 hours to complete a polymerization reaction. The reaction mixture was cooled to 40° C. or below and adjusted to pH 7.0 with aqueous ammonia, to obtain an aqueous solution of a copolymer resin (A1) having a solid content of about 25% and a 25° C. viscosity of 500 mPa·s.

| Mixture of vinyl monomers and water | |
|---|---|
| Methacrylamide | 70 parts |
| Methacrylic acid | 15 parts |
| 2-Hydroxyethyl methacrylate | 10 parts |
| Styrene | 5 parts |
| Deionized water | 200 parts |

To 400 parts of the above aqueous copolymer resin (A1) solution was added 70 parts of deionized water for solid content adjustment. The atmosphere inside the flask was replaced by nitrogen and the flask contents were heated to 75° C. 1.0 part of ammonium persulfate was added. Thereafter, a vinyl monomers emulsion having the following composition was continuously added in 3 hours and the resulting mixture was kept for 3 hours to complete a polymerization reaction. The reaction mixture was cooled to 40° C. or below and adjusted to pH 8.0 with aqueous ammonia to obtain a milky-white aqueous resin emulsion (C1) having a solid content of about 40% and a 25° C. viscosity of 1,900 mpa·s.

Figure 1:
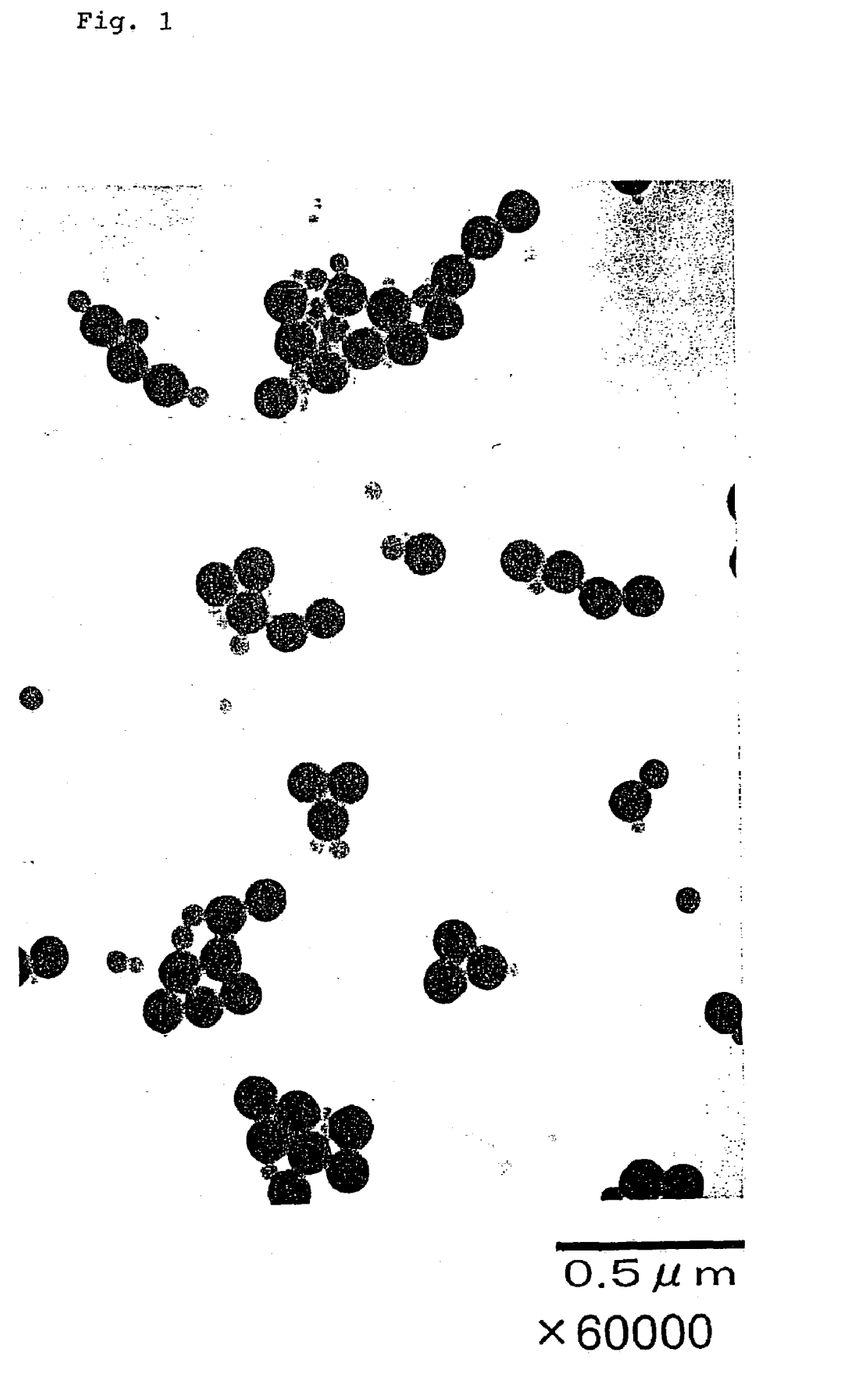
FIG. 1 is a photograph taken by observation through a scanning type electron microscope showing the appearance of the resin particles (C) of the emulsion of the present invention.

The emulsion was measured for dry particle diameters using a scanning type electron microscope. The result (the picture) is shown in FIG. 1. The particle diameters of the picture were measured and were in a range of 105 to 110 nm. The emulsion was also measured for water-swollen particle diameters by a dynamic light-scattering method, using a tester, LPA 3100 and a particle diameter laser analysis system, PAR-III both manufactured by Ohtsuka Denshi K.K. As a result, it was found that the number-average particle diameter was 512 nm and the emulsion comprised resin particles (B1) and a copolymer resin (A1) present on the surfaces of the resin particles (B1).

| Vinyl monomers emulsion | |
|---|---|
| Acrylonitrile | 100.0 parts |
| Butyl acrylate | 100.0 parts |
| Sodium dodecylbenzenesulfonate | 0.2 part |
| Deionized water | 80.0 parts |

Production Examples C2 to C5

Aqueous resin emulsions (C2) to (C5) were produced in the same manner as in Production Example C1 except that the copolymer (A1), used in Production Examle C1 was replaced by (A2), (A3), (A4) and (A5), respectively and there were used vinyl monomers emulsions shown in Table 2.

Production Example C6

An aqueous resin emulsion (C6) was produced in the same manner as in Production Example C1 except that, in the operation after production of a copolymer resin (A1) in Production Example C1, the amount of deionized water for solid content adjustment was changed to 400 parts, the amount of ammonium persulfate was changed to 2.5 parts and the vinyl monomers emulsion was changed as follows.

| Vinyl monomers emulsion | |
|---|---|
| Acrylonitrile | 250.0 parts |
| Butyl acrylate | 250.0 parts |
| Sodium dodecylbenzenesulfonate | 1.0 part |
| Deionized water | 200.0 parts |

Production Example C7

An aqueous resin emulsion (C7) was produced in the same manner as in Production Example C1 except that, in Production Example C6, no deionized water for solid content adjustment was used, the amount of ammonium persulfate was changed to 1.5 parts and the vinyl monomers emulsion was changed as follows.

| Vinyl monomers emulsion | |
|---|---|
| Acrylonitrile | 25.0 parts |
| Butyl acrylate | 25.0 parts |

-continued

| Vinyl monomers emulsion | |
|---|---|
| Sodium dodecylbenzenesulfonate | 0.25 part |
| Deionized water | 20.0 parts |

Production Example C8

An aqueous resin emulsion (C8) was produced in the same manner as in Production Example C1 except that, in Production Example C7, the amount of ammonium persulfate was changed to 1.0 parts and the vinyl monomers emulsion was changed as follows.

| Vinyl monomers emulsion | |
|---|---|
| Acrylonitrile | 50 parts |
| Butyl acrylate | 50 parts |
| Sodium dodecylbenzenesulfonate | 0.1 part |
| Deionized water | 40 parts |

Production Examples C9 to C11

Aqueous resin emulsions (C9), (C10) and (C11) were obtained in the same manner as in Production Example C1 except that the copolymer (A1) was replaced by (A6), (A7) and (A8) respectively. The (C9) was nearly a white slurry and caused agglomeration and precipitation while being allowed to stand.

Production Example C12

An aqueous resin emulsion (C12) was produced in the same manner as in Production Example C1 except that, in the operation after production of a copolymer resin (A1) in Production Example C1, the amount of deionized water for solid content adjustment was changed to 583 parts the amount of ammonium persulfate was changed to 3.3 parts and the vinyl monomers emulsion was changed as follows.

| Vinyl monomers emulsion | |
|---|---|
| Acrylonitrile | 333.0 parts |
| Butyl acrylate | 333.0 parts |
| Sodium dodecylbenzenesulfonate | 1.0 part |
| Deionized water | 266.0 parts |

Production Example C13

An aqueous resin emulsion (C13) was produced in the same manner as in Production Example C1 except that, in Production Example C7, the amount of ammonium persulfate was changed to 1.0 part and the vinyl monomers emulsion was changed as follows.

| Vinyl monomers emulsion | |
|---|---|
| Acrylonitrile | 17.0 parts |
| Butyl acrylate | 17.0 parts |

-continued

| Vinyl monomers emulsion | |
| --- | --- |
| Sodium dodecylbenzenesulfonate | 0.1 part |
| Deionized water | 7.0 parts |

The emulsions obtained in Production Examples C2 to C13 were measured for dry particle diameters and water-swollen particle diameters in the same manners as in Production Example C1, and it was confirmed that a copolymer (A) was present on the surfaces of resin particles (B2 to B13).

Comparative Production Example D1

400 parts of deionized water was fed into a separable flask equipped with a stirrer and a reflux condenser. The atmosphere inside the flask was replaced by nitrogen gas and the flask contents were heated to 75° C. Then, 2.5 parts of ammonium persulfate was added. Thereto was added, continuously in 3 hours, a vinyl monomers emulsion having the following composition. The resulting mixture was kept for 3 hours to complete a polymerization reaction. The reaction mixture was cooled to 40° C. or below and adjusted to pH 8.0 with aqueous ammonia, to obtain a white aqueous resin solution (D1) having a solid, content of about 40% and a 25° C. viscosity of 1,000 mPa·s.

| Vinyl monomers emulsion | |
| --- | --- |
| Methacrylamide | 120 parts |
| Acrylonitrile | 165 parts |
| Butyl acrylate | 165 parts |
| Methacrylic acid | 25 parts |
| 2-Hydroxyethyl methacrylate | 15 parts |
| Styrene | 10 parts |
| Sodium dodecylbenzenesulfonate | 1.0 part |
| Deionized water | 350 parts |

Comparative Production Example D2

550 parts of deionized water and 0.5 part of sodium dodecylbenzenesulfonate were fed into a separable flask equipped with a stirrer and a reflux condenser. The atmosphere inside the flask was replaced by nitrogen gas and the flask contents were heated to 75° C. Then, 2.5 parts of potassium persulfate was added. Thereto was added, continuously in 4 hours, a monomers emulsion having the following composition. The resulting mixture was kept for 3 hours to complete a polymerization reaction. The reaction mixture was cooled to 40° C. or below and adjusted to pH 8.0 with aqueous ammonia, to obtain a milky-white seed solution (S1) having a solid content of about 40% and a 25° C. viscosity of 20 mPa·s.

| Monomers emulsion composition | |
| --- | --- |
| Acrylonitrile | 225 parts |
| Butyl acrylate | 215 parts |
| Methacrylic acid | 10 parts |
| Styrene | 50 parts |
| Sodium dodecylbenzenesulfonate | 0.5 part |
| Deionized water | 200 parts |

Into a similar separable flask were fed 500 parts of the seed emulsion (S1) and 100 parts of deionized water. The atmosphere inside the flask was replaced by nitrogen gas and the flask contents were heated to 75° C. Then, 1.0 part of ammonium persulfate was added. Thereto was added, continuously in 2 hours, the following aqueous monomers solution. The resulting mixture was kept for 3 hours to complete a polymerization reaction, whereby was obtained a milky-white aqueous resin emulsion (D2) having a solid content of about 30%, a 25° C. viscosity of 3,000 mPa·s and a pH of 8.5.

| Aqueous monomers solution composition | |
| --- | --- |
| Methacrylamide | 80 parts |
| Methacrylic acid | 10 parts |
| 2-Hydroxyethyl methacrylate | 10 parts |
| Deionized water | 300 parts |
| 25% aqueous ammonia | 7 parts |

Thus, aqueous resin emulsions (C) for the thermal recording material of the present invention were produced. The compositions and results of the copolymer resins (A) used in production of (C) are shown in Table 1; and the compositions and results of the aqueous resin emulsions (C) are shown in Table 2-1 and the glass transition temperatures of the resins of the resin particles B1 to B13 are shown in Table 2-2.

TABLE 1

| Copolymer resin A | Composition | | | | | | Neutralized 25% aqueous solution | |
| --- | --- | --- | --- | --- | --- | --- | --- | --- |
| | a | b | | c | | | Viscosity | |
| | MAm | MAc | AAc | HEMA | ST | BA | mPa · s | Appearance |
| A1 | 70 | 15 | | 10 | 5 | | 500 | Transparent |
| A2 | 85 | | 10 | | | 5 | 1000 | Transparent |
| A3 | 50 | 30 | | | 10 | 10 | 600 | Slightly fluorescent and transparent |
| A4 | 80 | 5 | 5 | 10 | | | 1000 | Transparent |

TABLE 1-continued

| Copolymer resin A | Composition | | | | | | Neutralized 25% aqueous solution | |
|---|---|---|---|---|---|---|---|---|
| | a | b | | c | | | Viscosity | |
| | MAm | MAc | AAc | HEMA | ST | BA | mPa · s | Appearance |
| A5 | 95 | 5 | | | | | 2500 | Transparent |
| A6 | 90 | 1 | | 9 | | | | transparent but precipitation occurred |
| A7 | 40 | 55 | | 5 | | | 1200 | Transparent |
| A8 | 50 | 10 | | 10 | 15 | 15 | 1500 | Translucent |

MAm: methacrylamide
MAc: methacrylic acid
AAc: acrylic acid
HEMA: 2-hydroxyethyl methacrylate
ST: styrene
BA: butyl acrylate

TABLE 2-1

| Aqueous emulsion (C) | Used copolymer resin (A) d | Vinyl monomers (c)(%) e | | | | e/d Solid content weight ratio | Polymerization stability | Others |
|---|---|---|---|---|---|---|---|---|
| | | AN | MMA | ST | BA | | | |
| Production Example C1 | A1 | 50 | | | 50 | 100/50 | Good | |
| Production Example C2 | A2 | 50 | 10 | | 40 | 100/50 | Good | |
| Production Example C3 | A3 | 50 | | 20 | 30 | 100/50 | Good | |
| Production Example C4 | A4 | 40 | | 10 | 50 | 100/50 | Good | |
| Production Example C5 | A5 | 20 | 20 | 20 | 40 | 100/50 | Good | |
| Production Example C6 | A1 | 50 | | | 50 | 100/20 | Good | |
| Production Example C7 | A1 | 50 | | | 50 | 100/200 | Good | |
| Production Example C8 | A1 | 50 | | | 50 | 100/100 | Good | |
| Production Example C9 | A6 | 50 | | | 50 | 100/50 | Bad | White slurry |
| Production Example C10 | A7 | 50 | | | 50 | 100/50 | Good | |
| Production Example C11 | A8 | 50 | | | 50 | 100/50 | Good | |
| Production Example C12 | A1 | 40 | | 10 | 50 | 100/15 | Good | |
| Production Example C13 | A1 | 40 | | 10 | 50 | 100/300 | Good | |

AN: acrylonitrile
MMA: methyl methacrylate
ST: styrene
BA: butyl acrylate

TABLE 2-2

| Resin of Resin Particles (B) | |
|---|---|
| No. | Tg (° C.) |
| B1 | 4 |
| B2 | 20 |
| B3 | 38 |
| B4 | 4 |
| B5 | 19 |
| B6 | 4 |
| B7 | 4 |
| B8 | 4 |
| B9 | 4 |
| B10 | 4 |
| B11 | 4 |
| B12 | 4 |
| B13 | 4 |

Next, description is made on Examples wherein thermal recording materials were produced using each of Production Examples C1 to C13 as a protective layer. In each Example, parts refers, to parts by weight. Incidentally, Production Example C9, which had a problem in polymerization stability, was not used in any Example.

EXAMPLE 1

47 parts of water was added to 100 parts of the aqueous resin emulsion obtained in Production Example C1, for dilution. Thereto was added 11 parts of a 20% zinc stearate dispersion (F-115 produced by Chukyo Yushi Co., Ltd., an ultrafine particle type), followed by uniform mixing. The resulting mixture was coated on a commercial surface-untreated paper for word processor using a bar coater, in an amount (as dried) of 3 g/m² and then dried (forced drying at 60° C. for 30 seconds and then aging for 7 days in an atmosphere of 20° C. and 60% RH), whereby was obtained a thermal recording material.

EXAMPLE 2

A thermal recording material was obtained in the same manner as in Example 1 except that the aqueous resin emulsion obtained in Production Example C2 was used and 15.4 parts of a 13% aqueous zirconium carbonate ammonium solution (Zircosol AC-7 produced by Daiichi Kigenso Kagaku Kogyo Co., Ltd.) was added thereto as a crosslinking agent.

EXAMPLE 3

A thermal recording material was obtained in the same manner as in Example 1 except that the aqueous resin emulsion obtained in Production Example C3 was used and 6.7 parts of an epichlorohydrin-modified polyamideamine (Euramine P-5600 produced by Mitsui Chemicals, Inc.) was added thereto as a crosslinking agent.

EXAMPLE 4

A thermal recording material was obtained in the same manner as in Example 1 except that the aqueous resin emulsion obtained in Production Example C4 was used and thereto were added, as a crosslinking agent, 2 parts of a glycidyl ether of a polyhydric alcohol (Denacol 512 produced by Nagase & Company, Ltd.) and, as a filler, 12 parts of a slurry containing 50% of a dispersed fine powder silica (Mizukasil P-527 produced by Mizusawa Industrial Chemicals, Ltd.).

EXAMPLE 5

A thermal recording material was obtained in the same manner as in Example 1 except that the aqueous resin emulsion C5 obtained in Production Example C5 was used and thereto were added, as a crosslinking agent. 6.7 parts of the Euramine used in Example 3 and, as a filler, 8 parts of a slurry containing 50% of a dispersed kaolin (UW 90 produced by Engelhard).

EXAMPLE 6

A thermal recording material was obtained in the same manner as in Example 1 except that the aqueous resin emulsion C6 obtained in Production Example C6 was used and 2 parts of a polyfunctional aziridine compound (Chemitite PZ-33 produced by Nippon Shokubai Co., Ltd.).

EXAMPLE 7

A thermal recording material was obtained in the same manner as in Example 1 except that 20 parts of water was added to 100 parts of the aqueous resin emulsion C7 obtained in Production Example C7.

EXAMPLE 8

A thermal recording material was obtained in the same manner as in Example 1 except that the aqueous resin emulsion CB obtained in Production Example C8 was used.

Reference Example 1

A thermal recording material was obtained in the same manner as in Example 3 except that the aqueous resin emulsion C10 obtained in Production Example C10 was used.

Reference Example 2

A thermal recording material was obtained in the same manner as in Example 3 except that the aqueous resin emulsion C11 obtained in Production Example C11 was used.

Reference Example 3

A thermal recording material was obtained in the same manner as in Example 2 except that the aqueous resin emulsion C12 obtained in Production Example C12 was used and Mizukasil P 527 was added as a filler.

Reference Example 4

A thermal recording material was obtained in the same manner as in Example 1 except that the aqueous resin emulsion C13 obtained in Production Example C13 was used.

Comparative Examples 1 and 2

Thermal recording materials were obtained in the same manner as in Example 1 except that the aqueous resin emulsions obtained in Comparative Production Examples D1 and D2 were used.

The thermal recording materials obtained in Examples 1 to 7, Reference Examples 1 to 4 and Comparative Examples 1 to 2 were evaluated according to the following methods. The results of evaluation are shown in Table 3.

(1) Traveling Stability

Solid black recording was conducted under the following conditions using a thermal printer (TH-PMD produced by Ohkura Denki) to form a pattern image. In this operation, the degree of cracking sound and the stain of thermal head were examined and traveling stability was rated according to the following rating standard.

Recording conditions

Applied voltage: 24 V

Pulse width: 1.74 ms

Applied energy: 0.34 mj/dot

Rating standard

○; No sound, no head staining, and smooth paper feeding

Δ: Slight sound, but no head staining and no problem in paper feeding

X: A large cracking sound, head staining, a problem in paper feeding (2) Color Developing Sensitivity An image was formed under the same conditions as above, and the density of the image was measured by a Macbeth densitometer.

(3) Gloss

Measured according to JIS P 8142.

(4) Water Resistance

A color-undeveloped portion and a thermally recorded portion (obtained by applying a thermal block of 140° C. for 1 second) were rubbed 20 times with a water-wetted gauze, using a GAKUSHIN TYPE Tester for fastness to rubbing (without any load), and then the state of the thermally recorded portion was examined visually.

Rating Standard

◉: No change

○: Slight trace of rubbing

Δ: Slight detachment

X: Detachment (5) Plasticizer Resistance

A transparent polyvinyl chloride pressure-sensitive tape for electrical insulation (produced by Nitto Denko Corporation) was attached to an image portion for which the color developing sensitivity had been measured; they were allowed to stand at 40° C. for 24 hours; then, the tape was peeled; the densities of the tape-attached portion and the tape-non-attached portion were measured by a Macbeth densitometer; a density retention (%) was calculated using the following formula (a higher value is better).

Density retention (%)= (density of tape-attached portion)÷(density of tape-non-attached portion)×100

(6) Underlying Layer

The color-undeveloped portion of a thermally recorded side having a protective layer formed thereon was examined visually.

○: Good

X: There is fogging of an underlying layer clearly.

TABLE 3

|  | Production Example | Crosslinking agent | Filler |
|---|---|---|---|
| Example 1 | Production Example C1 |  |  |
| Example 2 | Production Example C2 | Zircosol AC-7 |  |
| Example 3 | Production Example C3 | Euramine P-5600 |  |
| Example 4 | Production Example C4 | Denacol 512 | Fine silica powder P-527 |
| Example 5 | Production Example C5 | P-5600 | Clay UW 90 |
| Example 6 | Production Example C6 | Chemitite PZ-33 |  |
| Example 7 | Production Example C7 |  |  |
| Example 8 | Production Example C8 |  |  |
| Reference Example 1 | Production Example C10 | P-5600 |  |
| Reference Example 2 | Production Example C11 | P-5600 |  |
| Reference Example 3 | Production Example C12 | AC-7 | P-527 |
| Reference Example 4 | Production Example C13 |  |  |
| Comparative Example 1 | Comparative Production Example D1 |  |  |
| Comparative Example 2 | Comparative Production Example D2 |  |  |

Production Example C9 was not tested owing to bad polymerization stability.

INDUSTRIAL APPLICABILITY

As described above, in the emulsion for thermal recording material according to the present invention, a copolymer resin (A) obtained by copolymerization of a monomers mixture containing (a) methacrylamide and (b) a carboxyl group-containing vinyl monomer is used as a stabilizer for obtaining resin particles (B) and, therefore, excellent polymerization stability is obtained. When the emulsion is used as a protective layer of thermal recording material, the resulting thermal recording material can exhibit sufficient durability and traveling stability under various use conditions and the protective layer thereof can have very high gloss.

The invention claimed is:

1. A resin component for a protective layer of a thermal recording material,
comprising resin particles (B) having a glass transition temperature greater than 0° C. and less than or equal to 60° C., and a copolymer resin (A) prepared by copolymerizing (a) methacrylamide and (b) a vinyl monomer having a carboxyl group; and
said resin particles (B) being prepared by polymerizing (c) a vinyl monomer with said copolymer resin (A) so that the copolymer (A) is distributed substantially on the surfaces of the resin particles (B).

2. The resin component of claim 1, which comprises resin particles (B) prepared by polymerizing (c) a vinyl monomer in the presence of a copolymer resin (A) obtained by making water-soluble, with a base, a copolymer resin (A) prepared by copolymerizing a monomer mixture containing (a) methacrylamide and (b) a vinyl monomer having a carboxyl group.

3. The resin component of claim 1, wherein the glass transition temperature of the resin particles (B) is 4° C. to 60° C.

4. The resin component of claim 1, wherein the glass transition temperature of the resin particles (B) is 4° C. to 38° C.

TABLE 4

|  | Traveling stability | Color developing sensitivity | Gloss | Water resistance | Plasticizer resistance | State of underlying layer | Others |
|---|---|---|---|---|---|---|---|
| Example 1 | ○ | 1.64 | 83 | ○ | 100 | ○ |  |
| Example 2 | ○ | 1.61 | 85 | ⊙ | 100 | ○ |  |
| Example 3 | ○ | 1.68 | 88 | ⊙ | 95 | ○ |  |
| Example 4 | ○ | 1.65 | 80 | ⊙ | 100 | ○ |  |
| Example 5 | ○ | 1.60 | 80 | ⊙ | 90 | ○ |  |
| Example 6 | Δ | 1.55 | 70 | ⊙ | 90 | ○ |  |
| Example 7 | ○ | 1.60 | 85 | ○ | 100 | ○ |  |
| Example 8 | ○ | 1.62 | 85 | ⊙ | 100 | ○ |  |
| Reference Example 1 | ○ | 1.64 | 80 | ⊙ | 100 | Fogging |  |
| Reference Example 2 | ○ | 1.60 | 86 | ⊙ | 30 | ○ |  |
| Reference Example 3 | X | 1.35 | 40 | Δ | 10 | ○ |  |
| Reference Example 4 | ○ | 1.65 | 85 | X | 0 | ○ | Cracking occurred in protective layer. |
| Comparative Example 1 | X | 1.62 | 40 | ⊙ | 60 | ○ |  |
| Comparative Example 2 | ○ | 1.62 | 50 | ⊙ | 100 | ○ |  |

5. A resin component for a protective layer of a thermal recording material,
comprising resin particles (B) having a glass transition temperature greater than 0° C. and less than or equal to 60° C., and prepared by polymerizing (c) a vinyl monomer in the presence of a copolymer resin (A) obtained by making water-soluble, with a base, a copolymer resin (A) prepared by copolymerizing a monomer mixture containing (a) methacrylamide and (b) a vinyl monomer having a carboxyl group.

6. The resin component of claim 5, wherein 30 to 95 parts by weight of the methacrylamide (a) and 2 to 50 parts by weight of the carboxyl group-containing vinyl monomer (b) are contained in 100 parts by weight of the solid content of the monomer mixture.

7. The resin component of claim 5, wherein the vinyl monomer (c) contains a nitrile group-containing vinyl monomer or an aromatic vinyl monomer.

8. The resin component of claim 5, wherein the amount of the copolymer resin (A) is 20 to 200 parts by weight when the total amount of the vinyl monomer (c) is 100 parts by weight.

9. The resin component of claim 5, wherein the glass transition temperature of the resin particles (B) is 4° C. to 60° C.

10. The resin component of claim 5, wherein the glass transition temperature of the resin particles (B) is 4° C. to 38° C.

11. A process for producing a resin component for a protective layer of a thermal recording material comprising:
a step of copolymerizing a monomer mixture containing (a) methacrylamide and (b) a vinyl monomer having a carboxyl group, to obtain a copolymer resin, and
a step of treating the copolymer resin with a base to convert it into a water-soluble copolymer resin (A) and then polymerizing (c) a vinyl monomer in the presence of the copolymer resin (A), to obtain resin particles (B), said particles (B) having a glass transition temperature greater than 0° C. and less than or equal to 60° C.

12. The process for producing a resin component of claim 11, wherein 30 to 95 parts by weight of the methacrylamide (a) and 2 to 50 parts by weight of the carboxyl group-containing vinyl monomer (b) are contained in 100 parts by weight of the solid content of the monomer mixture.

13. The process for producing a resin component of claim 11, wherein the vinyl monomer (c) contains a nitrile group-containing vinyl monomer or an aromatic vinyl monomer.

14. The process for producing a resin component of claim 11, wherein the amount of the copolymer resin (A) is 20 to 200 parts by weight when the total amount of the vinyl monomer (c) is 100 parts by weight.

15. The process for producing a resin component of claim 11, wherein the glass transition temperature of the resin particles (B) is 4° C. to 60° C.

16. The process for producing a resin component of claim 11, wherein the glass transition temperature of the resin particles (B) is 4° C. to 38° C.

17. A thermal recording material comprising a substrate, a thermal recording layer formed thereon, and protective layer formed on the thermal recording layer and/or on the back side of the substrate, wherein the resin component of the protective layer is the resin component of claim 1.

18. A thermal recording material comprising a substrate, a thermal recording layer formed thereon, and a protective layer formed on the thermal recording layer and/or on the back side of the substrate, wherein the resin component of the protective layer is the resin component of claim 5.

* * * * *